(12) United States Patent
Gong

(10) Patent No.: US 6,912,497 B2
(45) Date of Patent: Jun. 28, 2005

(54) CALIBRATION OF SPEECH DATA ACQUISITION PATH

(75) Inventor: Yifan Gong, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 716 days.

(21) Appl. No.: 10/051,469

(22) Filed: Jan. 18, 2002

(65) Prior Publication Data

US 2002/0177998 A1 Nov. 28, 2002

Related U.S. Application Data

(60) Provisional application No. 60/279,117, filed on Mar. 28, 2001.

(51) Int. Cl.$^7$ ............................ G10L 15/20; G10L 21/02
(52) U.S. Cl. ........................................ 704/228; 704/233
(58) Field of Search ................................. 704/226, 227, 704/228, 233, 243, 244

(56) References Cited

U.S. PATENT DOCUMENTS

| | | | | |
|---|---|---|---|---|
| 5,574,824 A | * | 11/1996 | Slyh et al. ................... | 704/226 |
| 5,765,124 A | * | 6/1998 | Rose et al. ................... | 704/242 |
| 5,924,065 A | * | 7/1999 | Eberman et al. ............. | 704/231 |
| 5,950,157 A | * | 9/1999 | Heck et al. ................... | 704/234 |
| 6,275,797 B1 | * | 8/2001 | Randic ......................... | 704/233 |
| 6,449,594 B1 | * | 9/2002 | Hwang et al. ............... | 704/233 |
| 6,633,842 B1 | * | 10/2003 | Gong ........................... | 704/233 |
| 6,658,385 B1 | * | 12/2003 | Gong et al. .................. | 704/244 |
| 6,691,091 B1 | * | 2/2004 | Cerisara et al. ............. | 704/255 |
| 6,778,957 B2 | * | 8/2004 | Wang et al. ................. | 704/233 |

OTHER PUBLICATIONS

Feder et al., "Maximum likelihood noise cancellation using the EM algorithm," IEEE Transactions on Acoustics, Speech, and Signal Processing, Feb. 1989, vol. 37, No. 2, pp. 204–216.*

Raj et al., "Cepstral compensation by polynomial approximation for environment–independent speech recognition," Fourth International Conference on Spoken Language, 1996, Oct. 3–6, 1996, vol. 4, pp. 2340–2343.*

Moreno et al., "A vector Taylor series approach for environment–independent speech recognition," 1996 IEEE International Conference on Acoustics, Speech, and Signal Processing, May 7–10, 1996, vol. 2, pp. 733–736.*

Kleban et al., "HMM adaptation and microphone array processing for distant speech recognition," 2000 IEEE International Conference on Acoustics, Speech, and Signal Processing, Jun. 5–9, 2000, vol. 3, pp. 1411–1414.*

(Continued)

*Primary Examiner*—Martin Lerner
(74) *Attorney, Agent, or Firm*—W. James Brady, III; Frederick J. Telecky, Jr.

(57) ABSTRACT

A method and system for calibration of a data acquisition path is achieved by applying a voice utterance to a first high quality microphone and reference path and to a test acquisition path including a test microphone such as a lower quality one used in a car. The calibration device includes detecting the power density of the reference signal $Y_R$ through the reference path and detecting the power density of the signal $Y_N$ through the acquisition path. A processor processes these signals to provide an output signal representing a noise estimate and channel estimate. The processing uses equation derived by modeling convolutive and additive noise as polynomials with different orders and estimating model parameters using maximum likelihood criterion and simultaneously solving linear equations for the different orders.

7 Claims, 4 Drawing Sheets

OTHER PUBLICATIONS

Moreno et al., "Multivariate–Gaussian–based cepstral normalization for robust speech recognition," 1995 International Conference on Acoustics, Speech, and Signal Processing, May 9–12, 1995, vol. 1, pp. 137–140.*

Treurniet et al., "Noise independent speech recognition for a variety of noise types," 1994 IEEE International Conference on Acoustics, Speech, and Signal Processing, Apr. 19–22, 1994, vol. 1, pp. I/437–I/440.*

Seokyong Moon et al., "Noisy speech recognition using robust inversion of hidden Markov models," 1995 International Conference on Acoustics, Speech, and Signal Processing, May 9–12, 1995, vol. 1, pp. 145–148.*

Woodland et al., "Improved environmental robustness in large vocabulary speech recognition," 1996 IEEE International Conference on Acoustics, Speech, and Signal Processing, May 7–10, 1996, vol. 1, pp. 65–68.*

* cited by examiner

CONVOLUTIVE NOISE ESTIMATION AT 30dB SNR

ADDITIVE NOISE ESTIMATION AT 30dB SNR

CONVOLUTIVE NOISE ESTIMATION AT 24dB SNR

ADDITIVE NOISE ESTIMATION AT 24dB SNR

CONVOLUTIVE NOISE ESTIMATION ERROR AS FUNCTION OF SNR
(EC: NO MODEL, POLY/EC: POLYNOMIAL MODEL)

ADDITIVE NOISE ESTIMATION ERROR AS FUNCTION OF SNR
(EA: NO MODEL, POLY/EA: POLYNOMIAL MODEL)

CALIBRATION OF SPEECH DATA ACQUISITION PATH

This application claims priority under 35 USC §119(e)(1) of provisional application No. 60/279,117, filed Mar. 28, 2001.

FIELD OF INVENTION

This invention relates to speech recognition and more particularly to calibration of speech data acquisition path.

BACKGROUND OF INVENTION

A speech acquisition path refers to the whole speech transmission path before the speech is actually digitized.

Typical speech acquisition path includes therefore air from lips to the microphone, microphone, wires, antialiasing filters, analog-to-digital converter. This is determining the transfer function of the system. Noises can be introduced at each of these devices and from power supply of the analog-to-digital converter.

Practical speech acquisition lines, especially for low cost devices, introduce both convolutive and additive noises to the input speech, and cause additional statistical mismatch between an utterance to be recognized and trained speech model set. Such mismatch will cause performance degradation.

Previously, SNR-dependent cepstral normalization (SDCN), fixed-code-word-dependent cepstral normalization (FCDCN) [See A. Acero. *Acoustical and Environmental Robustness in Automatic Speech Recognition*. Kluwer Academic Publishers, 1993], multi-variate Gaussian based cepstral normalization [P. Moreno, B. Raj, and R. Stern. Multi-variate Gaussian based cepstral normalization. In *Proc. of IEEE Internat. Conf. on Acoustics, Speech and Signal Processing*, Detroit, 1995] and statistical re-estimation [P. Moreno, B. Raj, and R. Stern. A unified approach to robust speech recognition. In *Proceedings of European Conference on Speech Communication and Technology*, Madrid, Spain, Sept. 1995] have been proposed to deal with similar problem. They all assume that the distortions can be modeled by a bias in the cepstral domain, which is clearly not the case for additive distortions. Vector Taylor series has been used to approximate the distortion as function of cepstral representation of additive and convolutive noises. See reference P. J. Moreno, B. Raj, and R. M. Stern. A vector taylor series approach for environment-independent speech recognition. In *Proc. of IEEE Internat. Conf on Acoustics, Speech and Signal Processing*, Atlanta, Ga., 1996.

SUMMARY OF INVENTION

In accordance with one embodiment of the present invention the parameters of the convolutive and additive noise are determined by a calibration of the speech acquisition path to compensate for the mismatch between an utterance to be recognized and a trained speech model set. In the power spectrum domain both types of noises are modeled as polynomial functions of frequency. The model parameters are estimated with maximum likelihood (ML) criterion on a set of simultaneous recordings.

DESCRIPTION OF PREFERRED EMBODIMENTS

In the power-spectral domain, the additive and convolutive noises are modeled as polynomial functions of frequency. The model parameters are estimated with Maximum Likelihood (ML) criterion, on a set of simultaneous recordings.

Once the parameter of the convolutive and additive noises are determined, speech recognizers can be compensated with these parameters, either by speech enhancement, or by model adaptation. See references: M. J. F. Gales. "nice" model-based compensation schemes for robust speech recognition. In *Robust speech recognition for unknown communication channels*, pages 55–64, Pont-a-mousson, France, 1997; Y Gong. Speech recognition in noisy environments: A survey. *Speech Communication*, 16(3): 261–291, April 1995; and C. H. Lee. On feature and model compensation approach to robust speech recognition. In *Robust speech recognition for unknown communication channels*, pages 45–54, Pont-a-mousson, France, 1997.

The present invention is determining the transfer function and associated noise estimate. What we want to determine is the frequency response of the microphone as well as the noise that may have been introduced by the A/D (analog to digital )conversion process. This is particularly needed for low quality microphones and noisy systems. To model the transfer function we need to determine the microphone followed by H (the linear filter) and the noise N of the A/D system. Hardware illustrated in FIG. 1 is used.

Figure 1:
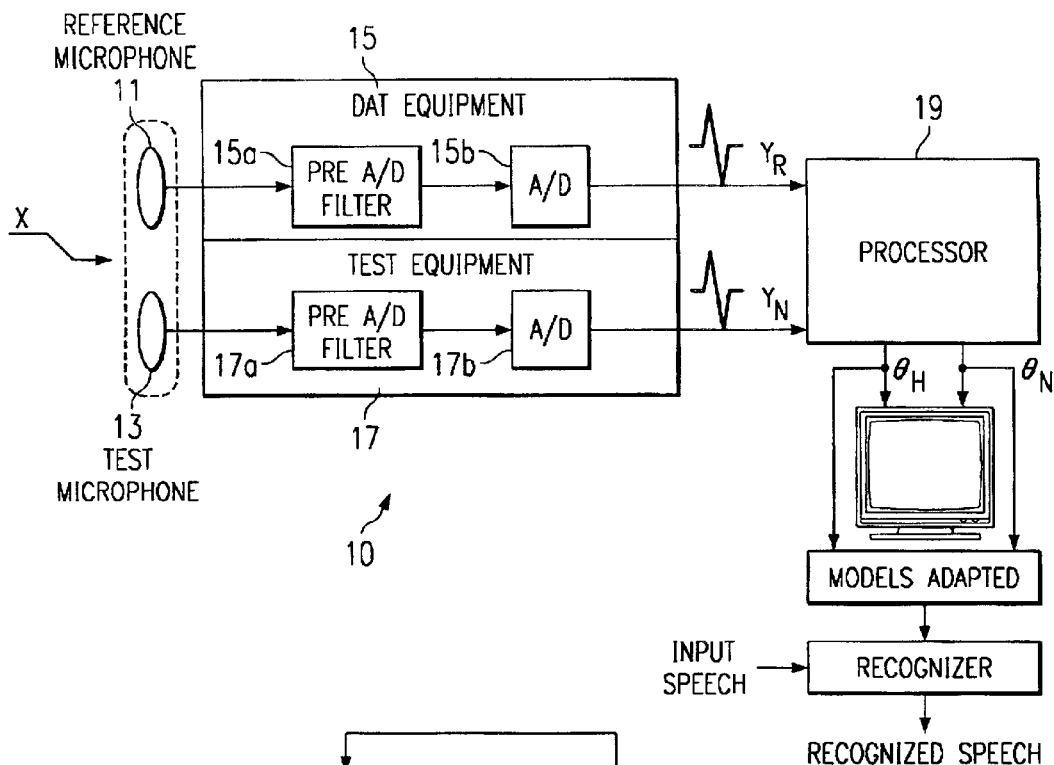
FIG. 1 illustrates the equipment configuration for the calibration according to one embodiment of the present invention.

The equipment 10 used is outlined in FIG. 1. It produces two signals: reference $Y_R$ and noisy $Y_N$. $Y_R$ is assumed to give a digitized speech signal under the same acoustic environment of the speech used to train the recognizer and is represented by microphone 11 and DAT (high quality data recording) equipment 15. For this reference H is 1 and N is zero. $Y_N$ is the noisy speech signal under the acoustic environment of the target application with the test microphone 13 and equipment under test path 17. Reference microphone 11 is the one used for recording the training database, and test microphone 13 is the one to be used in the target product for field operation. The equipment test path 17 may introduce both convolutive noises (microphone, pre-A/D (pre analog to digital) filter) and additive noises (environmental noises, any noises introduced before A/D, etc.), even when there is no background noise. The purpose here is to estimate the two noise components, with very short speech utterance (typically one) represented by X.

In the equipment configuration FIG. 1, we identify two environments: reference (R) and noisy (N). We represent a signal by its power spectral density sampled with a DFT (Discrete Fourier Transform) of 2M dimensions. Using $Y_R$ and $Y_N$ the distortion parameters are determined. For a given signal X, reference signal is $$Y_R \triangleq [Y_R^{(1)}, Y_R^{(2)}, \ldots Y_R^{(M)}]^t = H_R X \quad (1)$$

and that of the noisy signal is:

$$Y_N \triangleq [Y_{N(1)}, Y_N^{(2)}, \ldots Y_N^{(M)}]^t = H_N X + N_N + e \quad (2)$$

where e is assumed to be a zero mean Gaussian distribution with diagonal covariance matrix, i.e., e:[0, R].

As the pre-A/D filtering 15a as well as other parts of the reference equipment are of much higher acoustic quality than that of most speech recognizers, it is assumed that HR contains the information on the reference microphone 11. $H_N$ models the test microphone 13 and the pre A/D filter 17a of the equipment test path $N_N$ models the noise background introduced at any point of the test equipment. $H_R$ and $H_N$ are both M-dimensional diagonal matrices, and $N_N$ a M-dimensional vector. One can remove X by substituting $H_R^{-1} Y_R$ for X.

From Equation 1 and Equation 2, we have:

$$Y_N = H_\Delta Y_R + N_N + e \quad (3)$$

with $$H_\Delta \triangleq H_N H_R^{-1} \text{ (ratio of transfer function)} \quad (4)$$

We are interested in the estimate acoustic changes represented by $H_\Delta$ and $N_N$. There are so many combinations to determine these values. A model is assumed herein that $Y_N$ is only true when $Y_N$ follows a Gaussian distribution as in equation 5.

Let the i-th observed $Y_N$ be $Y_N(i)$, and the i-th observed $Y_R$ be $Y_R(i)$. The likelihood of a set of T observed noisy signals is then:

$$P(Y_N(1), Y_N(2), \ldots Y_N(T) | \lambda) = \quad (5)$$

$$\prod_{i=1}^{T} \frac{1}{(2\pi)^{M/2} |R|^{1/2}} \exp^{-\frac{1}{2}(Y_N(i) - H_\Delta Y_R(i) - N_N^i) R^{-1} (Y_N(i) - H_\Delta Y_R(i) - N_N)}$$

With limited amount of data, direct estimation of the parameters $H_\Delta \in R_M$ and $N_N \in R_M$ of the model may give unreliable results in noisy conditions. We propose to further limit the solutions of the two set of parameters in the spaces spanned by polynomial functions.

The further modeling to constraint the values of $H_\Delta$ uses the polynomial model. We assume the $H_\Delta$ has a value as a function of frequency and the change is not sudden but is smooth and a polynomial of a low order. We assume a noise will follow a Gaussian distribution. Let $k \in [0, M)$ be the frequency index, and $$v(k) \triangleq \frac{k}{M} \in [0, 1] \quad (6)$$

be the normalized frequency: In order to reduce the number of free parameters and improve the robustness of the estimation, we further assume that $H_\Delta$ is an order-P polynomial function of normalized frequency v:

$$H_\Delta \triangleq \text{diag}[b_1' \theta_H, b_2' \theta_H, \ldots b_k' \theta_H, \ldots b_M' \theta_H \quad (7)$$

where $$b_k^t \triangleq [1, v(k), v^2(k), \ldots v^{P-1}(k)] \quad (8)$$

$$\theta_H \triangleq [\theta_H^{(1)}, \theta_H^{(2)}, \ldots \theta_H^{P-1}]^t \quad (9)$$

Similarly, we assume that $N_N$ is an order-Q polynomial function of normalized frequency.

$$N_N \triangleq [C_1' \theta_N, C_2' \theta, \ldots C_k' \theta_N, \ldots C_M' \theta_N]^t \quad (10)$$

where $$c_k^t \triangleq [1, v(k), v^{(2)}(k), \ldots v^{Q-1}(k)] \quad (12)$$

The model parameter set is then:

$$\lambda \triangleq \{\theta_H, \theta_N, R\} \quad (13)$$

Determination of Parameters:

When you change $H_\Delta$ and $N_N$ in a Gaussian distribution it will change the shape. We change the shape so that the probability of observing $Y_N$ is maximized and is represented by equations 14 and 15.

Polynominal Coefficients;

Using maximum likelihood criterion to determine the parameter set $\lambda$, we have $$\frac{\partial}{\partial \theta_H} p(Y_N(1), Y_N(2), \ldots Y_N(T) | \lambda) = \quad (14)$$

$$\sum_{i=1}^{T} \sum_{k=1}^{M} (Y_N^k(i) - b_k^t \theta_H Y_R^k(i) - c_k^t \theta_N) \frac{\partial}{\partial \theta_H} \{b_k^t \theta_H\} Y_R^k(i) = 0$$

$$\frac{\partial}{\partial \theta_N} p(Y_N(1), Y_N(2), \ldots Y_N(T) | \lambda) \quad (15)$$

$$\sum_{i=1}^{T} \sum_{k=1}^{M} (Y_N^k(i) - b_k^t \theta_H Y_R^k(i) - c_k^t \theta_N) \frac{\partial}{\partial \theta_N} \{c_k^t \theta_N\} = 0$$

with $$\frac{\partial}{\partial \theta_H} \{b_k^t \theta_H\} = b_k \quad (16)$$

$$\frac{\partial}{\partial \theta_N} \{c_k^t \theta_N\} = c_k \quad (17)$$

By interchanging the summations, Equation 14 and Equation 15 can be rewritten as:

$$\forall_p = 1 \ldots P, \quad (18)$$

$$\sum_{j=1}^{P} \theta_H^{(j)} \sum_{k=1}^{M} v^{p+j-2}(k) \sum_{i=1}^{T} Y_R^k(i) + \sum_{j=1}^{Q} \theta_N^{(j)} \sum_{k=1}^{M} v^{p+j-2}(k) \sum_{i=1}^{T} Y_R^k(i) =$$

$$\sum_{k=1}^{M} v^{p-1}(k) \sum_{i=1}^{T} Y_R^k(i) Y_N^k(i)$$

$$\forall_q = 1 \ldots Q, \quad (19)$$

$$\sum_{j=1}^{P} \theta_H^{(j)} \sum_{k=1}^{M} v^{q+j-2}(k) \sum_{i=1}^{T} Y_R^k(i) + T \sum_{j=1}^{Q} \theta_N^{(j)} \sum_{k=1}^{M} v^{q+j-2}(k) =$$

$$\sum_{k=1}^{M} v^{q-1}(k) \sum_{i=1}^{T} Y_N^k(i)$$

Denote:

$$\alpha(m, f, g) \triangleq \sum_{k=1}^{M} v^m(k) \sum_{i=1}^{T} f^k(i) g^k(i) \quad (20)$$

$$\beta(m, f) \triangleq \sum_{k=1}^{M} v^m(k) \sum_{i=1}^{T} f^k(i) \quad (21)$$

$$\gamma(m) \triangleq T \sum_{k=1}^{M} v^m(k) \quad (22)$$

and $$A_p \triangleq [A_p^{(1)}, A_p^{(2)}, \ldots A_p^{(P)}] \text{ with } A_p^{(j)} = \alpha(p+j-2, Y_R, Y_R) \quad (23)$$

$$B_p \triangleq [B_p^{(1)}, B_p^{(2)}, \ldots B_p^{(Q)}] \text{ with } B_p^{(j)} = \beta(p+j-2, Y_R) \quad (24)$$

$$C_q \triangleq [C_q^{(1)}, \ldots B_q^{(P)}] \text{ with } C_q^{(j)} = \beta(q+j-2, Y_R) \quad (25)$$

$$D_q \triangleq [D_q^{(1)}, D_q^{(2)}, \ldots D_q^{(Q)}] \text{ with } D_q^{(j)} = \gamma(q+j-2) \quad (26)$$

$$u \triangleq [u_1, u_2, \ldots u_P]^t \text{ with } u_p = \alpha(p-1, Y_R Y_N) \quad (27)$$

$$v \triangleq [v_1, v_2, \ldots v_Q]^t \text{ with } v_q = \beta(q-1, Y_N) \quad (28)$$

Equation 19 and Equation 20 can be expressed as a linear system where H and N parameters are variable as follows:

$$\sum_{j=1}^{P} \theta_H^{(j)} A_p^{(j)} + \sum_{j=1}^{Q} \theta_N^{(j)} B_p^{(j)} = u, \; p = 1 \ldots P \quad (29)$$

$$\sum_{j=1}^{P} \theta_H^{(j)} + \sum_{j=1}^{Q} \theta_N^{(j)} D_q^{(j)} = u_q, \; q = 1 \ldots Q \quad (30)$$

Or, equivalently:

$$\begin{bmatrix} A & B \\ C & D \end{bmatrix} \begin{bmatrix} \theta_H \\ \theta_N \end{bmatrix} = \begin{bmatrix} u \\ v \end{bmatrix} \quad (31)$$

where $$A_{(P \times P)} \triangleq [A_1, A_2, \ldots A_P]^t \quad (32)$$

$$B_{(P \times Q)} \triangleq [B_1, B_2, \ldots B_P]^t \quad (33)$$

$$C_{(Q \times P)} \triangleq [C_1, C_2, \ldots C_Q]^t = B^T \quad (34)$$

$$D_{(Q \times Q)} \triangleq [D_1, D_2, \ldots D_Q]^t \quad (35)$$

Equation 31 is a linear system of P+Q variables, and can be solved by a general linear system solution method. See W. H. Press, B. P. Flannery, S. A. Teukolsky, and W. T. Vetterling. *Numerical Recipes in C. The Art of scientific programming.* Cambridge University Press, 1988.

Solving Linear System Equations:

Alternatively, a more efficient solution can be used, which solves one linear equation of order P and another of Q, rather than jointly solving linear systems with (P+Q) variables. From Equation 31 and Equation 34, we have the following block linear equations:

$$A\theta_H + B\theta_N = v \quad (36)$$

$$B^t \theta_H + D\theta_N = v \quad (37)$$

From Equation 36, $$\theta_H = A^{-1}(u - B\theta_N) \quad (38)$$

From Equation 37 and Equation 38 we obtain a linear system of equation on $\theta_N$:

$$(D - B^t A^{-1} B)\theta_N = v - B^t A^{-1} u \quad (39)$$

Solving Equation 31 can therefore be achieved by first solving Equation 39 for $\theta_N$ and then using Equation 38 for $\theta_H$. Similarly, for $\theta_H$, we can derive, from Eq-37, $$\theta_N = D^{-1}(v - B^t \theta_H) \quad (40)$$

From Eq-36 and Eq-40 we obtain a linear system of equation on $\theta_H$:

$$(A - BD^{-1}B^t)\theta_H = u - BD^{-1}v \quad (41)$$

Solving Equation 31 can therefore also be achieved by first solving Equation 41 for $\theta_H$ and then using Equation 40 for $\theta_N$.

Depending on the order of polynomials, one of the two solutions could be computationally more efficient than the other. Finally, we point out the property that A and D are symmetrical and contain only positive elements. That property can be exploited for more efficient solutions.

Covariance Matrix:

To solve for the coefficients of the covariance matrix, we make use of the two equalities:

$$\frac{\partial}{\partial A} \log|A| = A^{-1} \quad (42)$$

$$\frac{\partial}{\partial A} a^t A a = a a^t \quad (43)$$

To calculate the covariance matrix, we set the derivative of the logarithm of Equation 5 with respect to R-1 to zero, which gives:

$$R = \frac{1}{T} \sum_{i=1}^{T} (Y_N(i) - H_\Delta Y_R(i) N_N)(Y_N(i) - H_\Delta Y_R(i) - N_N)^t \quad (44)$$

To quantify the goodness of the fitting between the model and data, we use:

$$\in = \text{Trace}(R). \quad (45)$$

Figure 2:
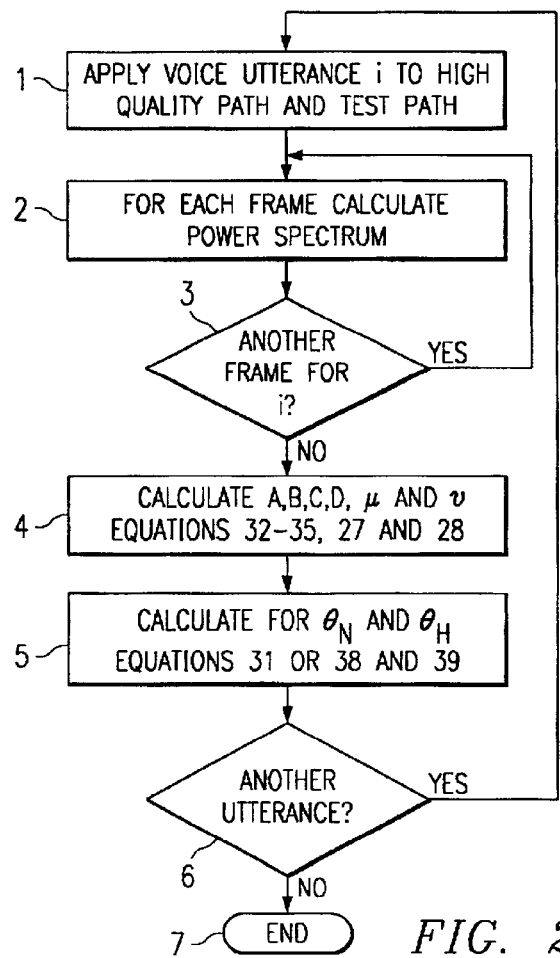
FIG. 2 illustrates the process steps for the calibration.

Referring to FIG. 2 there is illustrated the process steps for calibration. A voice utterance i is applied to a high quality path and a test path as illustrated in FIG. 1 (Step 1) and in Step 2 a measurement is made for each frame. For each frame of each utterance i the power spectrum is determined for reference $Y_R$ and test $Y_N$. After all frames are measured Step 3, for each utterance calculate equations 32–35 and 27 and 28 for A, B, C, D, u and v (Step 4). In Step 5 the noise estimate $\theta_N$ and the channel estimate $\theta_H$ are calculated using equation 31 or the noise estimate $\theta_N$ using equation 39 and channel estimate $\theta_H$ is calculated using equation 38.

Referring to the test equipment 10 of FIG. 1, the outputs $Y_R$ and $Y_N$ are applied to processor 19 that processes the signals according to FIG. 2 described above to produce the channel estimate $\theta_H$ and the noise estimate $\theta_N$ signal outputs. These output may be displayed on a display or directly applied to modify acoustic models in a recognizer. For example, the test equipment described in FIG. 1 may be used to test a cellular phone in a car. After a test utterance in the car using the test calibration unit described above the reference signal and the test signal are processed and the equipment provides a channel estimation and noise estimation either on the display for the user to manually enter the findings in the speech recognizer of the car or the outputs are provided directly to the recognizer.

To show this actually works we generate this kind of environment. The goal is to identify them back. The system has to recover the H and N from the observed $Y_N$. One is synthesized distortion and the other is recovered.

To simulate a distortion, the test speech signal yR(n) is modified in time domain according to the following operation:

$$y_N(n) = y_R(n) * h_A(n) + n_N(n) \quad (46)$$

The speech signal in the example is an utterance of the digit string two five eight nine six oh four (5.6 seconds). ho(n) is a five-coefficient FIR band-pass filter with cutoff frequencies at 0.10 and 0.35 and 26 dB attenuation. nN(n) is a computer generated white Gaussian noise sequence.

In speech signal, the energy is concentrated at low frequencies, which yields higher polynomial fitting error at high frequencies. To balance the errors, speech signal is pre-emphasized. As pre-emphasizing speech signal is a common practice in speech recognition, $H_A$ and $N_N$ estimated using pre-emphasized speech could be directly usable for compensation.

Throughout the experiments reported, we used 9th order of polynomes for convolutive noises (P=9), and 6th order of polynomes for additive noises (Q=6).

Noise estimate shown in the figures (labeled as "noise.PW") are obtained by averaging 30 seconds of noise power spectra.

In the figures below, "C" stands for convolutional noise, and "A" for additive noise. "POLY" stands for an estimate obtained by polynomial models. "FILTER" stands for the frequency response of the band-pass FIR filter.

To measure the estimation error, we use averaged inner product of the difference between the estimated noise and a reference:

$$e_v \triangleq \frac{1}{M}(\hat{v}-v)^t(\hat{v}-v) \quad \forall v \in \{H_A, N_N\} \quad (47)$$

For convolutive noise, the reference $\hat{H}_A$ is the power spectrum of the filter $h_A(n)$.

For additive noise, the reference $\hat{N}_N$ is the average of power spectra of the noise sequence.

FIG. 3 to FIG. 6 shows the results of estimation for convolutive and additive noises. In order to test the robustness against additive noise, A white Gaussian noise is introduced to the test channel, with variable SNR.

Figure 3:
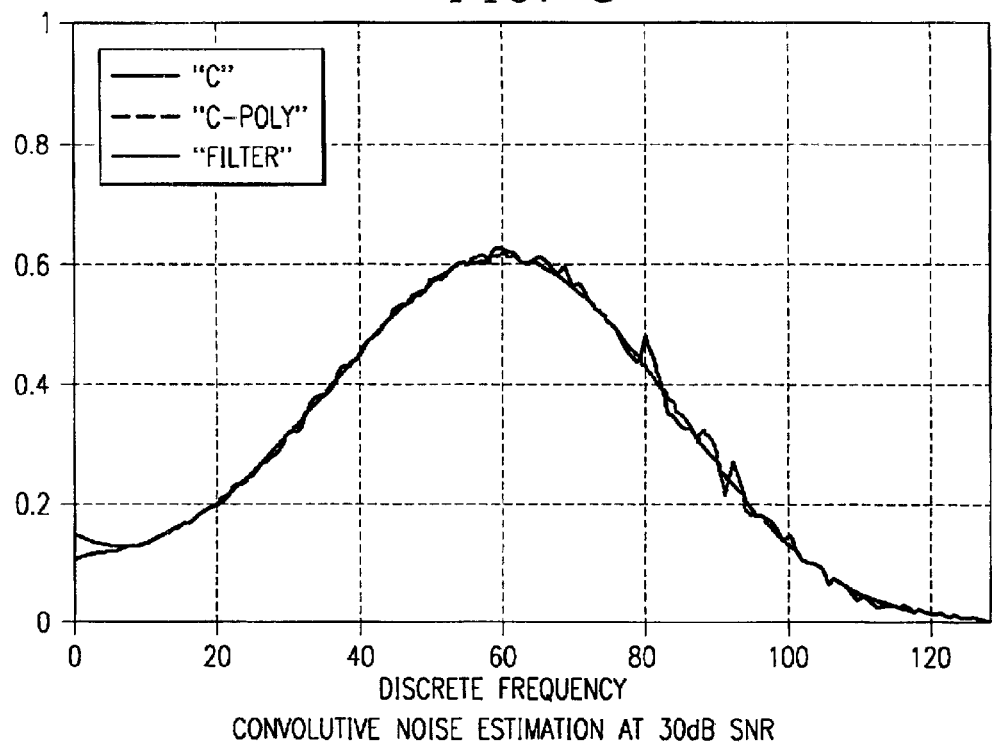
FIG. 3 illustrates the results of estimation for convolutive noise estimation at 30 db SNR.
Figure 4:
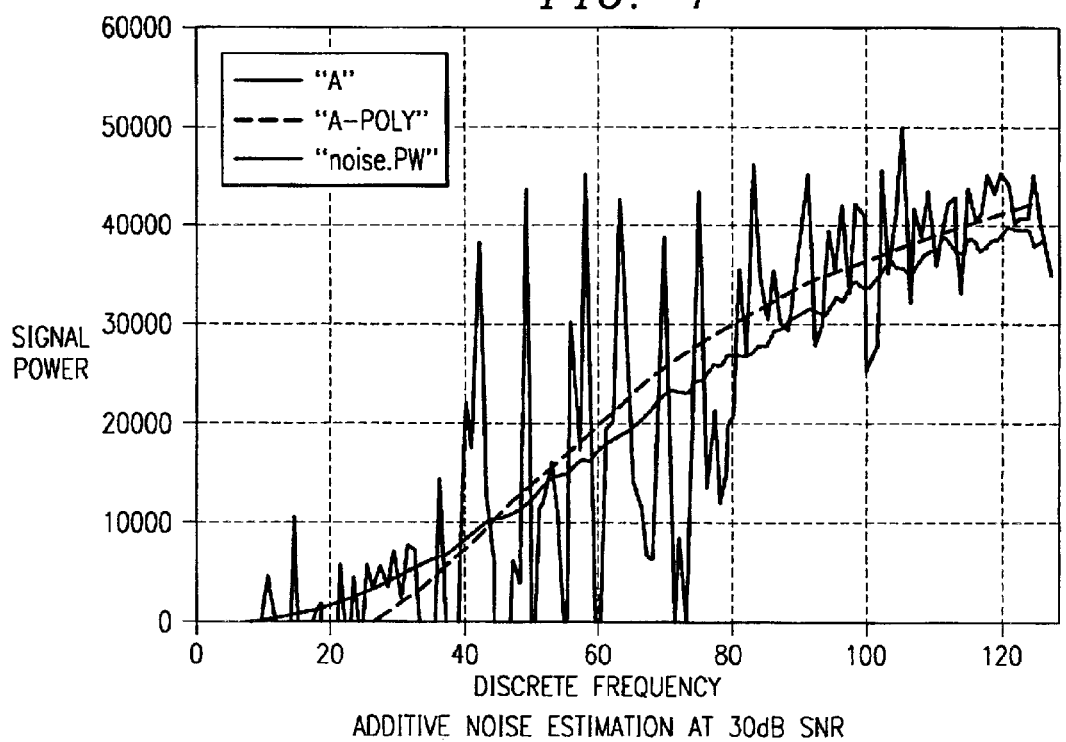
FIG. 4 illustrates the results of estimation for additive noise elimination at 30 db SNR.
Figure 5:
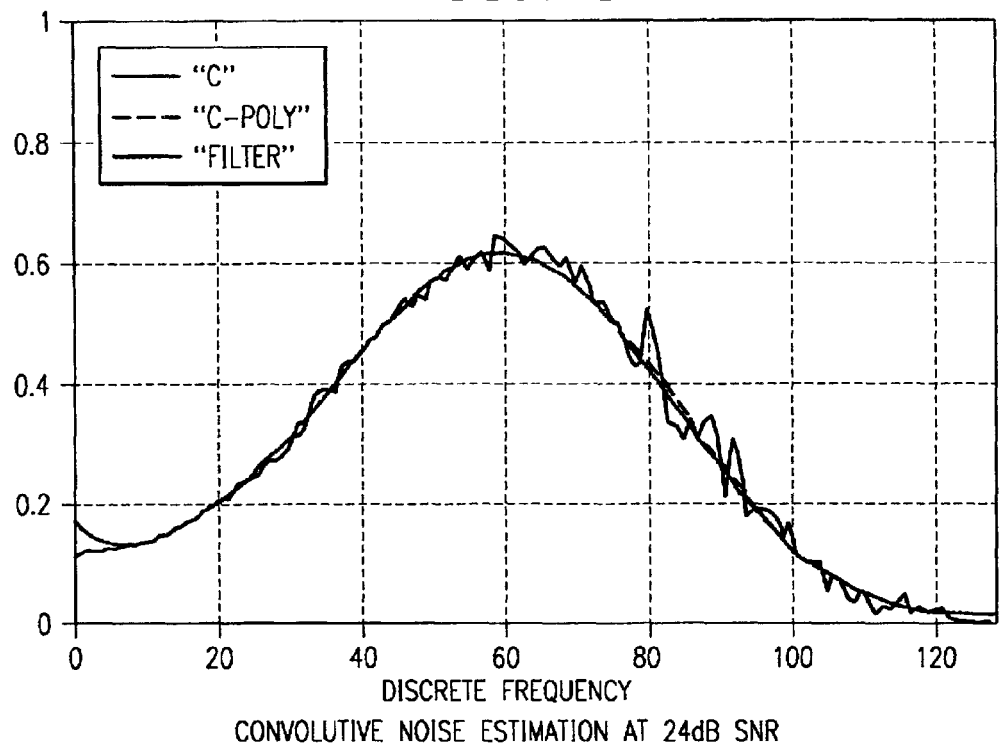
FIG. 5 illustrates the results of estimation for convolutive noise estimation at 24 db SNR.
Figure 6:
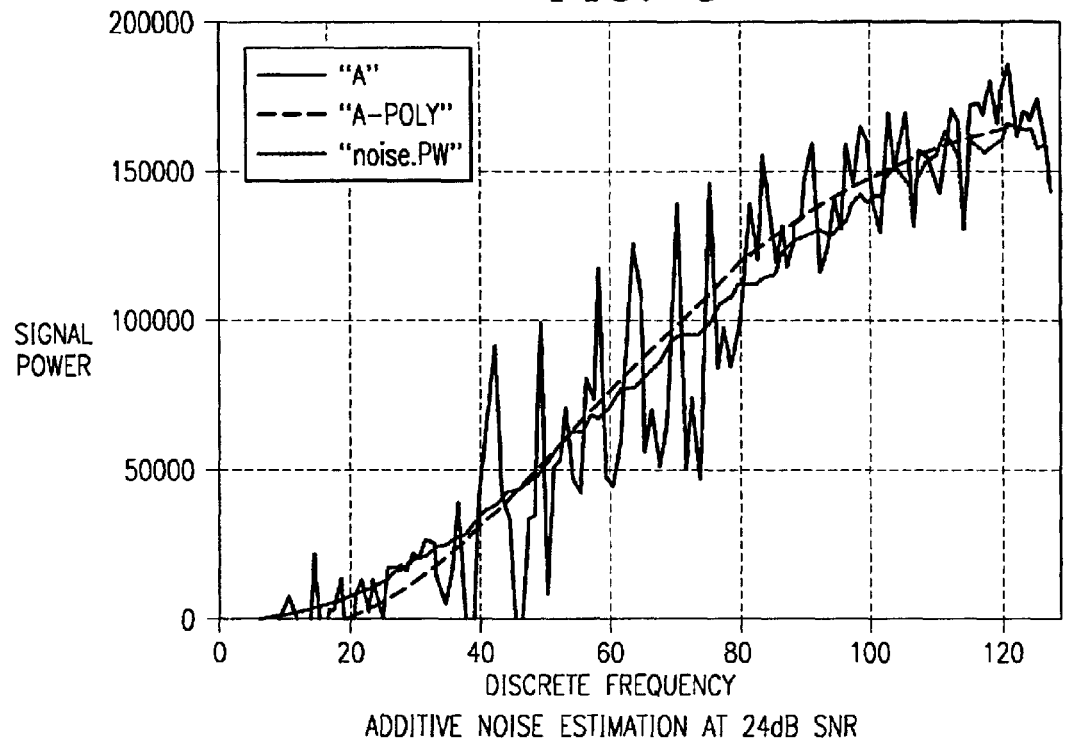
FIG. 6 illustrates the results of estimation for additive noise elimination at 24 db SNR.

The results are shown for a wide SNR ranges from 30 dB to −6 dB. In each figure, estimate by independent component bias model and by polynomial bias model are shown along with a reference bias. The following can be observed:

At 30 dB, the estimates of convolutive noise by both models are fairly close to the reference (FIG. 3). However, for additive noise, while the polynomial model gives good estimate, the estimate of additive noise by independent-component bias model shows large error with respect to the reference (FIG. 4).

Figure 7:
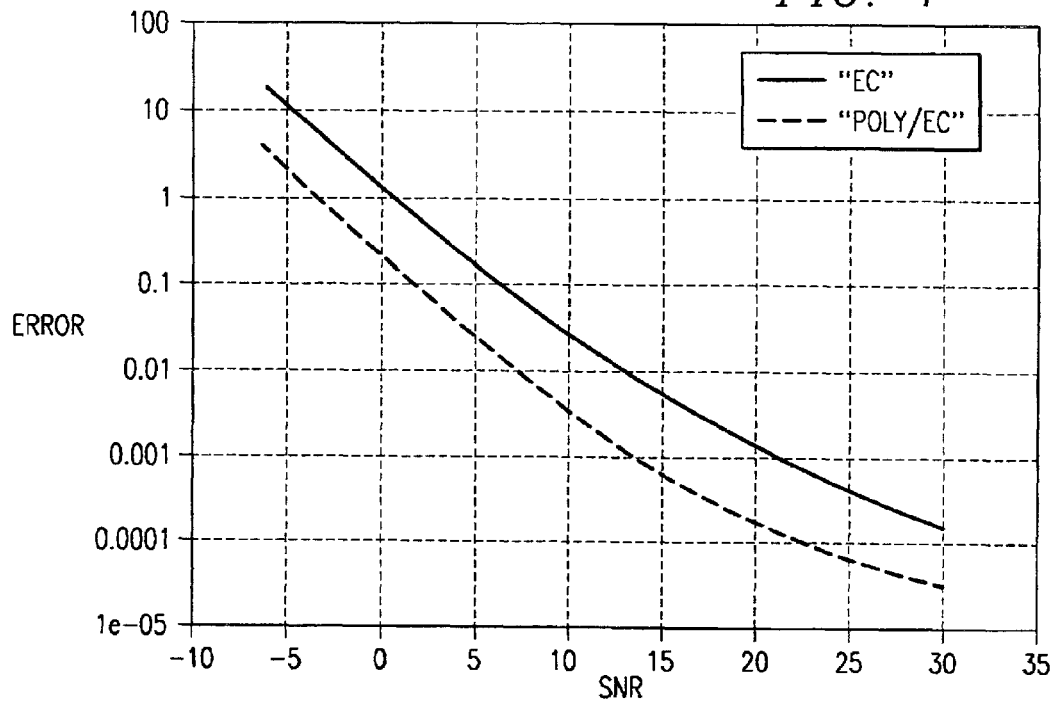
FIG. 7 illustrates that the estimation of the convolutive bias with independent component model gives 4.7 to 8.4 time larger estimation error.
Figure 8:
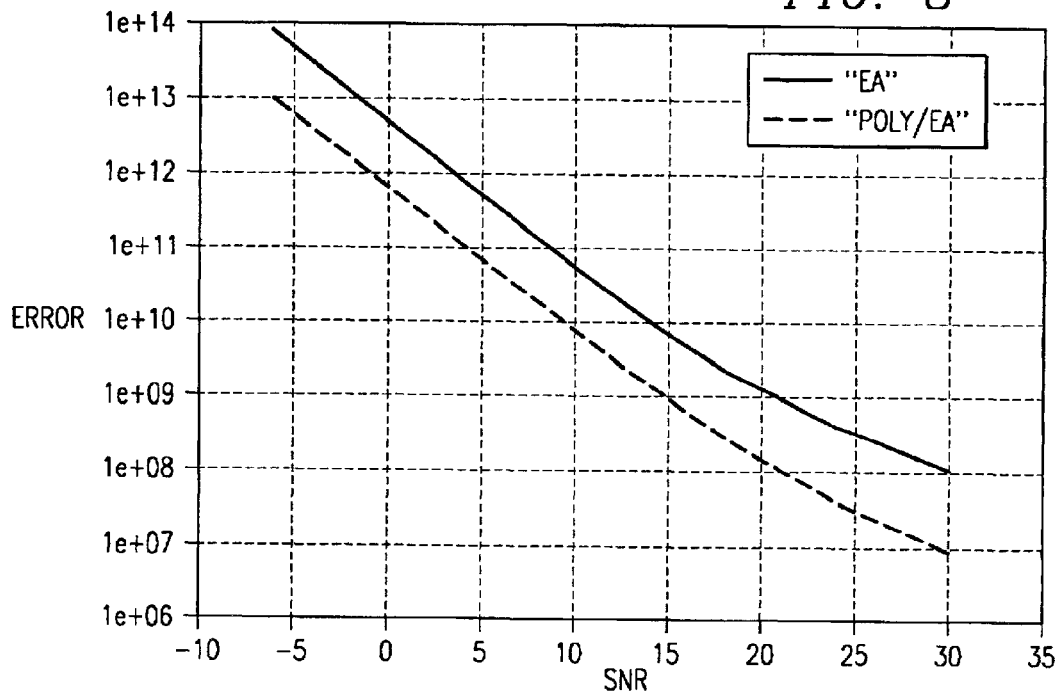
FIG. 8 illustrates that the estimation of additive bias with independent component model gives 7.5 to 12.3 time larger estimation error than with polynomial models.

To show the relative improvement using polynomial models, FIG. 7 and FIG. 8 plot the estimation error according to Equation 47, as function of SNR.

FIG. 7 shows that the estimation of convolutive bias with independent component model gives 4.7 to 8.4 time larger estimation error than with polynomial models.

FIG. 8 shows that the estimation of additive bias with independent component model gives 7.5 to 12.3 time larger estimation error than with polynomial models.

What is claimed is:

1. A method of calibrating the data acquisition path comprising the steps of:

applying a voice utterance signal simultaneously to two speech transmission paths where the first path is a high quality reference path and a second test path being the acquisition path;

detecting output power density of the reference path to produce signal $Y_R$ and detecting output power density of the second test path to produce the power density of the mismatch signal $Y_N$;

processing said reference signal $Y_R$ and said mismatch signal $Y_N$ to determine channel estimate and noise estimate of the mismatch using equations derived by modeling convolutive $H_A$ and additive noise $N_N$ as polynomial functions of frequency with one order P for $H_A$ and a different order Q for $N_N$, estimating model parameters using maximum likelihood criterion to determine the parameter set and simultaneously solving linear equation for both order P and Q.

2. The method of claim 1 wherein said solving step includes solving simultaneously one linear equation for the order of P and another for Q.

3. The method of claim 1 wherein said solving step includes jointly solving linear equation for P+Q variable.

4. A method of calibrating the data acquisition path for each utterance comprising the steps of:

applying a voice utterance signal simultaneously to two speech transmission paths where the first path is a high quality reference path and a second test path being the acquisition path;

detecting output power density of the reference path to produce signal $Y_R$ and detecting output power density of the second test path to produce the power density of the mismatch signal $Y_N$;

determining for each frame of the utterance the power spectrum for $Y_R$ and $Y_N$;

calculating for all of the frames of the utterance the following $$A_{(P \times P)} \triangleq [A_1, A_2, \ldots A_P]^t$$

$$B_{(P \times Q)} \triangleq [B_1, B_2, \ldots B_P]^t$$

$C_{(Q \times P)} \triangleq [C_1, C_2, \ldots C_Q]^t = B^T$ $D_{(Q \times Q)} \triangleq [D_1, D_2, \ldots D_Q]^t$ $u \triangleq [u_1, u_2, \ldots u_P]^t$ with $u_p = \alpha(p-1, Y_R Y_N)$ $v \triangleq [v_1, v_2, \ldots v_Q]^t$ with $v_q = \beta(q-1, Y_N)$ for A, B, C, D, u and v;

calculating for the utterance the noise estimate $\theta_N$ using the following: $(D - B^t A^{-1} B)\theta_N = v - B^t A^{-1} u$;

and calculating for the utterance the channel estimate $\theta_H$ using the following: $\theta_H = A^{-1}(u - B\theta_N)$.

5. A method of calibrating the data acquisition path for each utterance comprising the steps of:

applying a voice utterance signal simultaneously to two speech transmission paths where the first path is a high quality reference path a high and a second test path being the acquisition path to produce the mismatch signal $Y_N$;

determining for each frame of the utterance the power spectrum for $Y_R$ and $Y_N$;

calculating for all of the frames of each utterance the following $A_{(P \times P)} \triangleq [A_1, A_2, \ldots A_P]^t$ $B_{(P \times Q)} \triangleq [B_1, B_2, \ldots B_P]^t$ $C_{(Q \times P)} \triangleq [C_1, C_2, \ldots C_Q]^t = B^T$ $D^{(Q \times Q)} \triangleq [D_1, D_2, \ldots D_Q]^t$ $u \triangleq [u_1, u_2, \ldots u_P]^t$ with $u_p = \alpha(p-1, Y_R Y_N)$ $v \triangleq [v_1, v_2, \ldots v_Q]^t$ with $v_q = \beta(q-1, Y_N)$ for A, B, C, D, u and v;

calculating the noise estimate $\theta_N$ and the channel estimate $\theta_H$ using the following:

$$\begin{bmatrix} A & B \\ C & D \end{bmatrix} \begin{bmatrix} \theta_H \\ \theta_N \end{bmatrix} = \begin{bmatrix} u \\ v \end{bmatrix}.$$

6. A data acquisition path calibration device comprising:

a first speech transmission path including a high quality microphone and pre-A/D processing and a second test acquisition path including a lower quality microphone;

means for detecting for each frame the power spectrum density of an input signal received over said first path to produce a reference signal $Y_R$ and for detecting for each frame the power spectrum density of said input signal received over said acquisition path to produce mismatch signal $Y_N$ means for determining the noise estimate and the channel estimate by calculating for each utterance:

$A_{(P \times P)} \triangleq [A_1, A_2, \ldots A_P]^t$
$B_{(P \times Q)} \triangleq [B_1, B_2, \ldots B_P]^t$
$C_{(Q \times P)} \triangleq [C_1, C_2, \ldots C_Q]^t = B^T$
$D_{(Q \times Q)} \triangleq [D_1, D_2, \ldots D_Q]^t$ $u \triangleq [u_1, u_2, \ldots u_P]^t$ with $u_p = \alpha(p-1, Y_R Y_N)$ $v \triangleq [v_1, v_2, \ldots v_Q]^t$ with $v_q = \beta(q-1, Y_N)$ for A, B, C, D, u and v;

calculating for the utterance the noise estimate $\theta_N$ using the following: $(D - B^t A^{-1} B)\theta_N = v - B^t A^{-1} u$;

and calculating for the utterance the channel estimate $\theta_H$ using the following: $\theta_H = A^{-1}(u - B\theta_N)$.

7. A data acquisition path calibration device comprising:

a first speech transmission path including a high quality microphone and pre-A/D processing and a second test acquisition path including a lower quality microphone;

means for detecting for each frame the power spectrum density of an input signal received over said first path to produce a reference signal $Y_R$ and for detecting for each frame the power spectrum density of said input signal received over said acquisition path to produce mismatch signal $Y_N$ means for determining the noise estimate and the channel estimate by calculating for each utterance:

$A_{(P \times P)} \triangleq [A_1, A_2, \ldots A_P]^t$
$B_{(P \times Q)} \triangleq [B_1, B_2, \ldots B_P]^t C_{(Q \times P)} \triangleq [C_1, C_2, \ldots C_Q]^t = B^T$
$D_{(Q \times Q)} \triangleq [D_1, D_2, \ldots D_Q]^t$ $u \triangleq [u_1, u_2, \ldots u_Q]^t$ with $u_p = \alpha(p-1, Y_R Y_N)$ $v \triangleq [v_1, v_2, \ldots v_Q]^t$ with $v_q = \beta(q-1, Y_N)$ for A, B, C, D, u and v;

calculating the noise estimate $\theta_N$ and the channel estimate $\theta_H$ using the following:

$$\begin{bmatrix} A & B \\ C & D \end{bmatrix} \begin{bmatrix} \theta_H \\ \theta_N \end{bmatrix} = \begin{bmatrix} u \\ v \end{bmatrix}.$$

* * * * *